(12) United States Patent
Yin et al.

(10) Patent No.: US 8,567,482 B2
(45) Date of Patent: Oct. 29, 2013

(54) HEAT TUBE DEVICE UTILIZING COLD ENERGY AND APPLICATION THEREOF

(75) Inventors: Xuejun Yin, Qingdao (CN); Jisheng Song, Qingdao (CN)

(73) Assignee: Xuejun Yin (CN)

( * ) Notice: Subject to any disclaimer, the term of this patent is extended or adjusted under 35 U.S.C. 154(b) by 1224 days.

(21) Appl. No.: 11/721,725

(22) PCT Filed: Dec. 16, 2005

(86) PCT No.: PCT/CN2005/002218
§ 371 (c)(1),
(2), (4) Date: Jul. 18, 2008

(87) PCT Pub. No.: WO2006/063532
PCT Pub. Date: Jun. 22, 2006

(65) Prior Publication Data
US 2009/0211727 A1 Aug. 27, 2009

(30) Foreign Application Priority Data
Dec. 17, 2004 (CN) .......................... 2004 1 0075463

(51) Int. Cl.
*F28D 15/00* (2006.01)
*F28D 17/00* (2006.01)
*F28D 19/00* (2006.01)
*F24J 3/08* (2006.01)

(52) U.S. Cl.
USPC ...... 165/10; 165/45; 165/104.21; 165/104.26

(58) Field of Classification Search
USPC .............................. 165/10, 104.26, 45, 104.21
See application file for complete search history.

(56) References Cited

U.S. PATENT DOCUMENTS

| 2,220,295 | A | * | 11/1940 | Siedle .............................. 62/483 |
| 4,044,949 | A | * | 8/1977 | Morawetz et al. ............ 126/586 |
| 4,121,566 | A | * | 10/1978 | Radenkovic ................... 126/585 |
| 4,269,167 | A | * | 5/1981 | Embree .......................... 126/572 |
| 4,270,521 | A | * | 6/1981 | Brekke .......................... 126/563 |
| 4,284,062 | A | * | 8/1981 | Swindle ........................ 126/587 |
| 4,299,200 | A | * | 11/1981 | Spencer ........................ 126/584 |
| 4,502,286 | A | * | 3/1985 | Okada et al. ............. 165/104.21 |
| 4,574,779 | A | * | 3/1986 | Hayes ........................... 126/641 |
| 4,986,348 | A | * | 1/1991 | Okayasu .................. 165/104.24 |

(Continued)

FOREIGN PATENT DOCUMENTS

| CN | 1064923 A | 9/1992 |
| CN | 2350711 | 11/1999 |

(Continued)

OTHER PUBLICATIONS

Office Action for Japanese Patent Application No. 200410075463.0 (including translation), mailing date unknown, 8 pages.

(Continued)

*Primary Examiner* — Ljiljana Ciric
(74) *Attorney, Agent, or Firm* — Sheridan Ross P.C.

(57) ABSTRACT

An energy storage device that stores hot and/or cold energy includes an evaporating part and a condensing part. According to one aspect, the evaporating part includes a heat tube in a U shape or a thimble shape and further includes one or more power cycle tubes. A working substance within the evaporating part evaporates after absorbing heat and condenses in the condensing part after releasing heat.

25 Claims, 6 Drawing Sheets

(56) References Cited

U.S. PATENT DOCUMENTS

| | | | |
|---|---|---|---|
| 5,195,577 A * | 3/1993 | Kameda et al. | 165/104.33 |
| 5,203,399 A * | 4/1993 | Koizumi | 165/104.33 |
| 7,201,215 B2 * | 4/2007 | Ippoushi et al. | 165/104.24 |
| 8,266,819 B2 * | 9/2012 | Zillmer et al. | 165/10 |
| 8,327,920 B2 * | 12/2012 | Kudo | 165/10 |
| 8,434,308 B2 * | 5/2013 | Booth et al. | 165/104.26 |
| 8,443,868 B2 * | 5/2013 | Barnwell | 165/10 |

FOREIGN PATENT DOCUMENTS

| | | |
|---|---|---|
| CN | 1554920 | 12/2004 |
| GB | 2225099 A | 5/1990 |
| JP | 2003307395 A | 10/2003 |
| JP | 2003318342 | 11/2003 |
| SU | 1049724 | 10/1983 |

OTHER PUBLICATIONS

International Search Report (including translation) for International (PCT) Patent Application No. PCT/CN2005/002218, mailed Mar. 9, 2006.

Written Opinion (including translation) for International (PCT) Patent Application No. PCT/CN2005/002218, mailed Mar. 9, 2006.

International Preliminary Report on Patentability (including translation) for International (PCT) Patent Application No. PCT/CN2005/002218, issued Jun. 19, 2007.

* cited by examiner

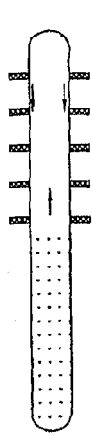
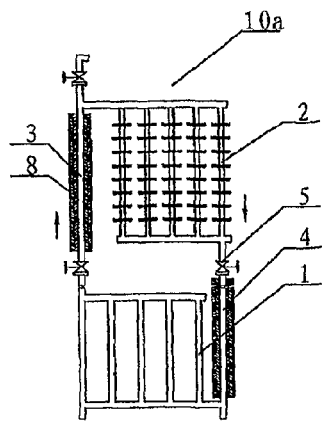
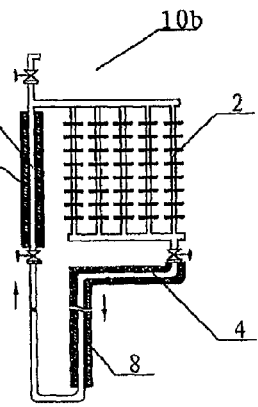
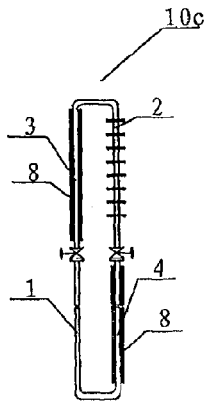
FIG. 1 (Prior Art)　　FIG. 2　　FIG. 3　　FIG. 4
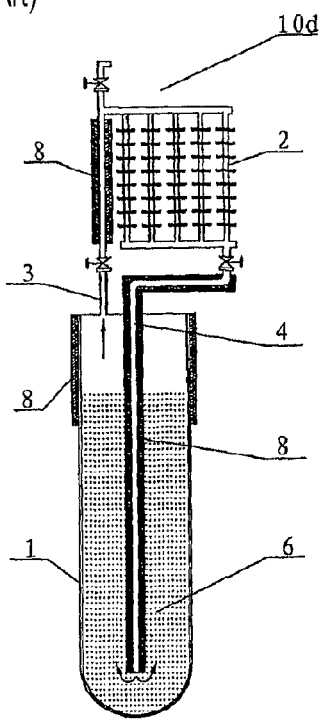
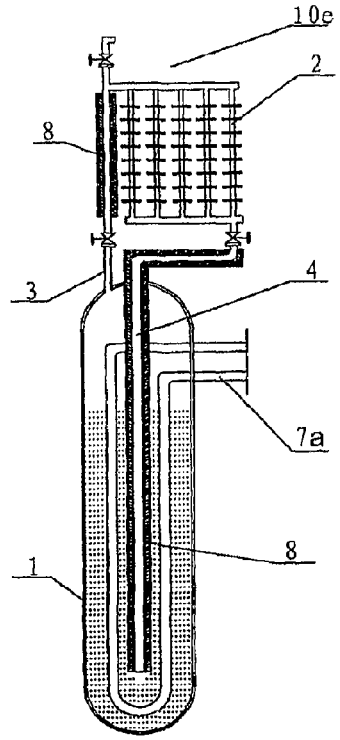
FIG. 5　　FIG. 6

HEAT TUBE DEVICE UTILIZING COLD ENERGY AND APPLICATION THEREOF

CROSS REFERENCE TO RELATED APPLICATIONS

This application is a national stage application under 35 U.S.C. 371 of PCT Application No. PCT/CN2005/002218 having an international filing date of Dec. 16, 2005, which designated the United States, which PCT application claimed the benefit of Chinese Patent Application No. 200410075463.0, filed Dec. 17, 2004, the entire disclosure of each of which is hereby incorporated herein by reference.

TECHNICAL FIELD

The present invention relates to a refrigeration system, associated system of heating and refrigeration, geothermal energy utilizing system, cold storing apparatus, heat storing apparatus and the accessories thereof, and in particular relates to an air conditioning system utilizing natural cold energy, geothermal energy, thermal waste, residual heat and environmental friendly energy.

BACKGROUND ART

Most of the current refrigerating and energy storing apparatuses and air conditioners utilize a compressor for cycle refrigerating the working substance through compression-expansion. It has the drawbacks of high product energy consumption, high operating cost, unstable operation, complicated maintenance, use of harmful medium, direct and indirect discharge of greenhouse gases and other contamination, noise pollution, strong dependence on electric power, and strong influence on electric power peak load.

The published specification of the Chinese a patent application for invention No. 91101569.8 discloses a refrigerating device composed of air conduit, coolant, transfusion box and cold storing body, wherein the air conduit exchanges heat with the coolant through the transfusion box for coolant, and the transfusion box for coolant exchanges heat with the cold storing body by communicating the coolant in steel tubes. In winter, it automatically introduce the amount of cold in the atmosphere by utilizing the static pressure difference generated by the hot and cold air and wind velocity in the air conduit, and store it in the cold storing body by using latent heat of phase change of water. When refrigerating in summer, the cold energy can be released through the heat exchange by the cold water supplying tube and the circulating of coolant with the cold storing body.

Said energy storage apparatus utilizes natural cold energy to achieve the object of energy saving and preventing the discharge of greenhouse gases and other contamination. But it has the following defects: (1) the input and output of cold energy is carried out by a large amount of commercial coolant, thus forced circulation is required at least for the output of cold energy, resulting in the low efficiency of the natural convection; (2) the input and output of cold energy both go through a secondary heat exchange, which will lower the efficiency of heat exchange and increase the loss of cold energy; (3) the air conduit can not eliminate loss of cold energy during conduction and convection; (4) the air conduit would be clogged; (5) the air and the steel tube wall have low efficiency of heat exchange, and a large amount of tubing and supports are required in real engineering; (6) the natural cold energy storage device satisfying the requirement of heat preservation, anti-expansion, anti-infiltration, and high efficiency of heat exchange is expensive, which is difficult to be put into practice.

Some of the current cold storing devices also use a single heat tube shown in FIG. 1 as the cold conducting element, but such storage apparatus with single heat tube still has the following defects: (1) the ascending vapor and descending coolant are in the same tube with circulation resistance occurred therebetween, causing an effect of heat exchange between each other, thus affecting the conducting power. Therefore the single heat tube has small cold conducting power; (2) relatively higher manufacturing cost under the condition of same conducting power; (3) the assembling is limited by angle; (4) it can not achieve ordered freezing by switching on and off or adjusting the magnitude of power.

SUMMARY OF THE INVENTION

In order to overcome the above defects, one of the objects of the present invention is to provide a heat tube device capable of conducting cold and heat energies automatically by utilizing natural cold energy, geothermal energy, thermal waste, residual heat and environmental friendly energy.

The second object of the present invention is to provide an energy storage device for storing natural cold energy, thermal waste, residual heat and environmental friendly energy.

The third object of the present invention is to provide an air conditioning device utilizing natural cold energy, geothermal energy, thermal waste, residual heat and environmental friendly energy.

The fourth object of the present invention is to provide a geothermal energy utilizing device and an air conditioning device utilizing geothermal energy.

The fifth object of the present invention is to provide a building system utilizing natural cold energy, geothermal, energy, thermal waste, residual heat and environmental friendly energy.

A heat tube device of the present invention is realized in a way that it includes an evaporating part, a condensing part, an ascending tube and a reflow tube, wherein the upper and lower ends of the evaporating part are not higher than the upper and lower ends of the condensing part respectively, the upper end of the evaporating part is connected to the upper end of the condensing part through the ascending tub, and the lower end of the condensing part is connected to the lower end of the evaporating part through the reflow tube, thus constituting a heat tube loop.

The evaporating part is composed of a plurality of evaporating tubes in parallel connection, alternatively may be composed of a single evaporating tube, which is in a U shape communicated with the reflow tube. Alternatively, the evaporating part may be a thimble tube with the upper orifice communicated with the ascending tube, the reflow tube being inserted into the mid-lower portion of the thimble tube cavity.

The condensing part is composed of a plurality of condensing tubes in parallel connection, alternatively may be composed of a single condensing tube; it is in an inverted U shape communicated with the ascending tube. At the same time, there are fins disposed externally on the condensing tubes of the condensing part.

At least one of a part of the evaporating tube, the ascending tube and the reflow tube has an insulating layer disposed outside of the tube wall, alternatively the tube wall is made of material having low heat conducting coefficient.

At least one valve is disposed on the heat tube loop.

Power cycle pipelines are disposed between at least part of the evaporating tubes or within the cavities of the evaporating tubes of the evaporating part, the inlet and outlet of the power cycle pipelines being positioned outside of the evaporating part.

An energy storing device of the present invention is realized in a way that it is composed of an energy storing medium and a heat tube device, wherein the evaporating part of the heat tube device is positioned within the energy storing medium, which may be water, rocky soil, phase changing energy storing material, or other heat storing materials.

An insulating material is provided outside of the energy storing medium, and power cycle pipelines are provided inside of the energy storing medium, said power cycle pipelines being substantially uniformly distributed in the energy storing medium.

An air conditioning device of the present invention is realized in a way that it is composed of energy storing device and an terminal loop exchanging heat with the energy storing device, the terminal loop comprising an air conditioning terminal, which may be fan coiler, radiator, ground coiler, or tubule grid.

A heat exchanger is disposed between the terminal loop and the energy storing device, the energy storing device exchanging heat with the heat exchanger via the condensing end of the heat tube or the power cycle pipelines, the heat exchanger exchanging heat with the terminal loop.

A heat pump is disposed between the terminal loop and the energy storing device, the input end of the primary cold source or primary heat source of the heat pump exchanging heat with the heat exchanger, the output end of the heat pump supplying cold or heat to the terminal loop.

One of the energy storing devices is a cold storing device, wherein the condensing part of the heat tube is in the atmosphere, for conducting the natural cold energy from the atmosphere and storing it in the energy storing medium. The power cycle pipelines disposed in the evaporating part of the heat tube or in the energy storing device are communicated with the terminal loop. The heat exchanger is disposed between the power cycle pipelines and the terminal loop. The power cycle pipelines are connected to an output end of a refrigerator which uses peak-valley electricity or wind energy for refrigerating, and store the output cold energy in the energy storing medium.

Another energy storing device is a heat storing device, wherein the condensing part of the heat tube device is communicated with the terminal loop. The condensing part of the heat tube device is positioned in the heat exchanger. The power cycle pipelines disposed in the evaporating part of the heat tube or in the energy storing device are connected to a heat source. The heat source is the residual heat, thermal waste, or environmental friendly energy from industry and household life, for example, the heat energy from the solar energy heat collection device, the heat pump using peak-valley electricity for heating, or the heat pump using wind energy for heating.

A geothermal energy utilizing device and an air conditioning device utilizing geothermal energy of the present invention are realized in a way that the evaporating part of the heat tube device is positioned in a geothermal layer and the condensing part is positioned in the object to be heated. The object to be heated is solid, liquid or gas, or a building.

A geothermal energy utilizing device and an air conditioning device utilizing geothermal energy of the present invention are realized in another way that the evaporating part of the heat tube device is positioned in a geothermal layer, the condensing end of the heat tube is positioned in and exchanges heat with the heat exchanger, the heat exchanger exchanging heat with the object to be heated via the terminal loop. The object to be heated is solid, liquid or gas, or a building. The terminal loop comprises an air conditioning terminal, which may be fan coiler, radiator, circulating coiler, or tubule grid.

A building system of the present invention is realized in a way that it comprises an air conditioning device and a building, wherein the air conditioning terminal of the air conditioning device is inside the building.

For the first aspect, the energy storing device is a cold storing device. The evaporating part of the heat tube device, together with the energy storing medium, is positioned over or under the ground outside the building, and the condensing part of the heat tube is positioned in the atmosphere outside the building over the ground. The power cycle pipelines in the cold storing device or in the heat tube device are connected directly to the air conditioning end section, or exchange heat with the air conditioning end section via the heat exchanger or the heat pump.

For the second aspect, the energy storing device is a heat storing device. The power cycle pipelines of the heat tube device are communicated with a source of heat to be stored. The condensing part of the heat tube device is connected directly to the air conditioning end section, or exchanges heat with the air conditioning end section via the heat exchanger or the heat pump.

For the third aspect, the heat supplying source of the air conditioning device comes from the natural geothermal layer under the ground. The condensing part of the heat tube device is connected directly to the air conditioning end section, or exchanges heat with the terminal loop via the heat exchanger or the heat pump.

For the fourth aspect, the energy storing device comprises a cold storing device and a heat storing device, both connected to the terminal loop. The terminal loop exchanges heat with the cold storing device when supplying cold; and exchanges heat with the heat storing device or the natural geothermal layer when supplying heat.

BRIEF DESCRIPTION OF THE DRAWINGS

FIG. 1 is a structural schematic view showing the heat tube device in the prior art;

FIG. 2 is a first structural schematic view showing the heat tube device in the present invention;

FIG. 3 is a second structural schematic view showing the heat tube device in the present invention;

FIG. 4 is a third structural schematic view showing the heat tube device in the present invention;

FIG. 5 is a fourth structural schematic view showing the heat tube device in the present invention;

FIG. 6 is a fifth structural schematic view showing the heat tube device in the present invention;

PREFERRED MODE FOR CARRYING OUT THE INVENTION

Figure 7:
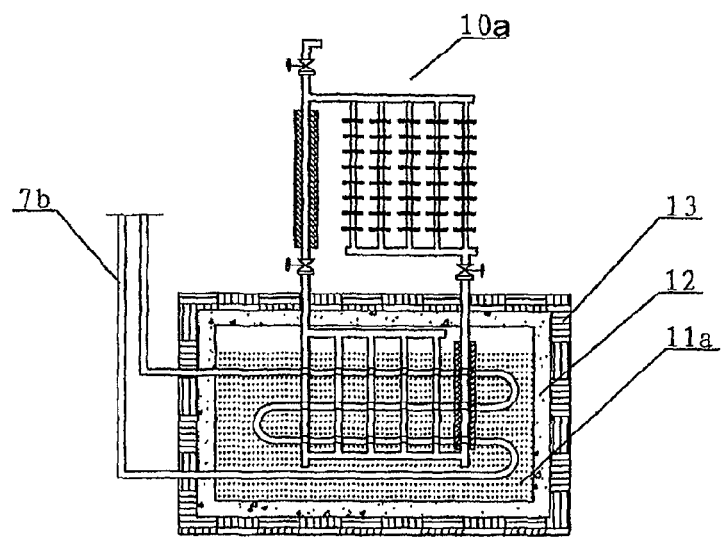
FIG. 7 is a first structural schematic view showing the energy storing device in the present invention.

Embodiment 1 of the Heat Tube Device

As shown in the FIG. 2, a heat tube device 10a of the present invention comprises an evaporating part 1, a condensing part 2, an ascending tube 3 and a reflow tube 4, wherein the evaporating part is composed of a plurality of evaporating tubes in parallel connection and the condensing part is composed of a plurality of condensing tubes in parallel connection. The evaporating part 1 is lower than the condensing part 2, the upper end of the evaporating part is connected to the upper end of the condensing part through the ascending tube 3, and the lower end of the condensing part is connected to the lower end of the evaporating part through the reflow tube 4, thus constituting a heat tube loop. An insulating layer 8 is disposed on the ascending tube 3 and the reflow tube 4, or is made of material having low heat conducting coefficient. There are fins disposed externally on the condensing tubes of the condensing part. The evaporating tubes of the evaporating part 1 are filled with working substance having low boiling point. Valves 5 are disposed on the heat tube loop in order to adjust and control heat exchange power and to facilitate injection of working substance, wherein one valve is disposed on the ascending tube and the reflow tube respectively, and a valve is disposed at the top of the ascending tube.

The operating principle of said heat tube device is as follows. When the outside temperature of the evaporating part 1 is higher than the outside temperature of the condensing part 2, the working substance with a low boiling point in the evaporating part 1 evaporates after absorbing heat from the outside of the evaporating part via the tube wall, the vapor ascends along the ascending tube 3 into the condensing part 2, and condenses after releasing heat to the outside of the condensing part. The condensed liquid re-enters into the evaporating part 1 through the reflow tube 4, transferring the heat from the outside of the evaporating part toward the outside of the condensing part, and also transferring the cold from the outside of the condensing part toward the outside of the evaporating part, thus completing the thermal cycle. Said cycle runs automatically as long as the temperature of the outside of the evaporating part is higher than that of the condensing part. Otherwise, the heat transfer process stops automatically so as to realize the upwards one-way heat conduction. The process of upwards one-way heat conduction is, at the same time, a process of downwards one-way cold conduction.

Compared with the prior art shown in FIG. 1, the special structure of the present heat tube allows the evaporating medium to circulate in the heat tube device in one direction. The ascending vapor and the descending condensing medium run respectively in the ascending tube and the reflow tube, which do not interfere or exchange heat with each other. The circulation direction of the medium is the same as that of the upwards heat conduction and the downwards cold conduction, thus achieving very high conduction efficiency.

Embodiment 2 of the Heat Tube Device

As shown in FIG. 3, a heat tube device 10b is different with respect to the embodiment 1 in that the heat tube device 10b of an evaporating part 1 is composed of a single evaporating tube, which is in a U-shape communicated a the reflow tube 4. An insulating layer 8 is disposed on an ascending tube 3 and the reflow tube 4. The advantage of said structure is in that the evaporating part may be placed deeply in a cold storing body. Said structure may be adapted to the construction of deep well spiles which can realize the heat energy transfer in the vertical direction for a great distance. When the ascending tube 3 and the reflow tube 4 are provided with long horizontal sections at the same time, it can also realize long-distance heat energy transfer in the horizontal direction.

When the condensing part is in a liquid or solid medium, the condensing tubes may not be provided with fins thereon.

Embodiment 3 of the Heat Tube Device

As shown in FIG. 4, a heat tube device 10c is different with respect to the embodiment 2 in that the heat tube device 10c of a condensing part 2 is composed of a single condensing tube, which is in an inverted U shape communicated with the ascending tube 3. An insulating layer 8 is disposed on an ascending tube 3 and a reflow tube 4. The advantage of said structure is in that the condensing part may be placed deeply in the medium. Said structure may realize the heat energy transfer in the vertical direction for a deep distance. When the ascending tube 3 and the reflow tube 4 are provided with long horizontal sections at the same time, it can also realize long-distance heat energy transfer.

Embodiment 4 of the Heat Tube Device

As shown in FIG. 5, the heat tube device 10d differs with respect to the embodiment 1 in that the evaporating part 1 is a thimble tube with the upper orifice thereof communicated with an ascending tube 3, and a reflow tube 4 being inserted into the lower portion of the cavity of the thimble tube. An insulating layer 8 is disposed on the ascending tube 3 and the reflow tube 4. The cavity of the thimble tube is filled with working substance 6 with a low boiling point.

When the temperature of the medium outside the evaporating part is not uniform, usually the surface layer has lower temperature, the evaporating tube with lower temperature may be provided with an insulating layer 8 at the upper section, so as to prevent heat energy from dissipating toward the medium outside the surface layer via the upper section of the evaporating tube, whereby improving the efficiency of heat conduction.

Compared with the preceding embodiments, the working substance with a low boiling point in the evaporating part 1 evaporates after absorbing heat from the outside of the evaporating part 1 via the tube wall, the vapor ascends along the ascending tube 3 into the condensing part 2, and condenses after releasing heat to the outside of the condensing part. The condensed working substance liquid re-enters into the center of the bottom of the thimble tube of the evaporating part through the reflow tube 4, and is re-heated to evaporate, thus completing the thermal cycle.

Compared with the current straight inserting heat tube shown in FIG. 1, although the evaporating part is also a round tube which is also easy for drilling and spilling to be put into practice, the special structure of the present embodiment allows the evaporating medium to circulate in the heat tube device in one direction. The ascending vapor and the descending condensing medium run respectively in the ascending tube and the reflow tube, without interfering or exchanging heat with each other. The circulation direction of the medium is the same as that of the upwards heat conduction and the downwards cold conduction, thus achieving very high conduction efficiency, thus achieving the heat conduction of greater depth and greater amount of heat. The insulating layer provided on the upper section of the evaporating part can prevent dissipation of heat energy, thereby further improving the depth and efficiency of heat conduction.

Embodiment 5 of the Heat Tube Device

As shown in FIG. 6, the heat tube device 10e is different with respect to the embodiment 4 in that a power cycle tube 7a is disposed inside the thimble tube of the evaporating part 1, the inlet and outlet of the power cycle tube 7a being positioned out of the evaporating part 1. An insulating layer 8 is disposed on an ascending tube 3 and a reflow tube.

Compared with the preceding embodiments, which may realize upwards one-way heat conduction and downwards one-way cold conduction but can not realize reverse conduction, the present embodiment can realize heat and cold conduction in any direction and with ultra deep and long distance by pumping power since it is integrated with the power cycle tube 7a.

Embodiment 1 of the Energy Storing Device

As shown in FIG. 7, an energy storing device is composed of a heat tube device 10a and an energy storing medium, which may be liquid-solid phase changing storage material or water 11a. There are a plurality of heat tube devices 10a being substantially uniformly distributed in the energy storing medium 11a. The evaporating part 1 of the heat tube device is positioned in the energy storing medium 11a. A housing 12 is provided outside the energy storing medium, and the external surface of the housing 12 is provided with an insulating material 13. The housing 12 is completely closed, with the insulating material 13 completely closed or partially closed. The condensing part 2 is disposed outside of the energy storing medium 11a and the insulating material 13, usually in the atmosphere. Power cycle pipelines 7b are provided inside the energy storing medium, said power cycle pipelines 7b being substantially uniformly distributed between the evaporating tubes of the heat tube device.

Said device may achieve the following four functions:

Storing cold: Referring to the embodiment 1 of the heat tube device, the working principle thereof is as follows. When the ambient temperature is lower than the temperature of the energy storing medium, for example water, the heat tube circulation is started automatically, transferring the heat energy from the water to the ambient atmosphere. When the water temperature gradually drops along with the air temperature to 0° C. of the freezing point of water, the water freezes along the evaporating tube wall of the heat tubes. As the above said process continues, the icicle formed along the evaporating tube wall gradually grows in a radial direction, thus achieving ordered freezing. The volume expansion caused by the freezing process is absorbed by the ascending of water not yet freezing. As long as the interval between the evaporating tubes is smaller than the minimum distance between the evaporating tube and the housing, the water between the evaporating tubes freezes preferentially. Before the water completely freezes, the valve on the ascending tube may be shut off individually or shut off together with the valve on the reflow tube, whereby actively cutting off the heat tube circulation and preventing the damage of the housing due to the frost heaving of the ice, thus achieving the object of preventing frost heaving.

The present cold storing device can both store cold across seasons (winter, spring, summer) and store cold from diurnal amplitude. When the air temperature is lower than the freezing point, it stores cold by water-to-ice phase changing latent heat and temperature difference sensible heat; when the air temperature is higher than the freezing point, it stores cold by the temperature difference sensible heat from cooling of water.

Releasing cold: By circulating the medium inside the power cycle pipelines disposed in the energy storing medium or directly circulating the water in a mixed state of ice and water, the cold energy stored in the ice can be released to a heat exchanging device or be directly released to a cold energy using terminal, for example, fan coiler of air conditioner.

Storing heat: In the shut-off states of the ascending valve and the descending valve, the power cycle pipelines store the heat energy generated from various heat sources into the present storage device in the form of sensible heat or latent heat.

Releasing heat: In the turn-on states of the ascending valve and the descending valve, the stored heat energy can be transferred automatically to the condensing part of the heat tube by the ascending force of the vapor of the working substance in the heat tube, without using the pumping power, such that the heat energy is released to the heat exchanging device connected to the condensing part, or directly released to a heat energy using terminal, thus preventing consumption of pumping energy.

Embodiment 2 of the Energy Storing Device

Figure 8:
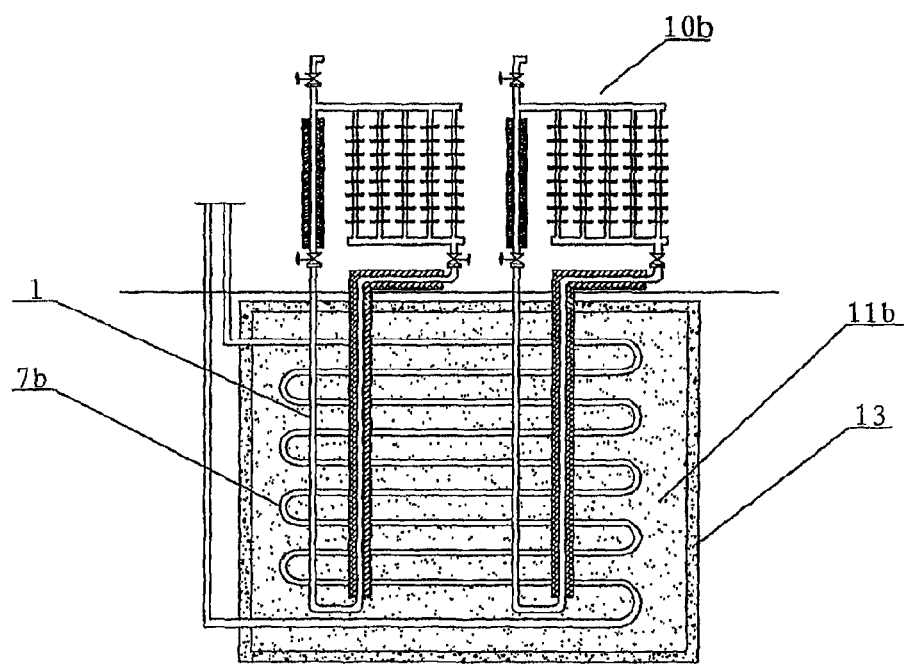
FIG. 8 is a second structural schematic view showing the energy storing device in the present invention.

As shown in FIG. 8, the energy storing device is composed of a heat tube device 10b and an energy storing medium, which may be solid phase changing storage material or soil or gravel 11b mixed with solid phase changing storage material. There are a plurality of heat tube devices being juxtaposed and being substantially uniformly distributed in the energy storing medium. The evaporating part 1 of the heat tube device is positioned in the energy storing medium. An insulating material 13 is provided outside the energy storing medium and is complete closed. The condensing part 2 is disposed outside of the energy storing medium and the insulating material 13. Power cycle pipelines 7b are provided inside the energy storing medium, said power cycle pipelines 7b being substantially uniformly distributed between the evaporating tubes of the heat tube device 10b.

Compared with the embodiment 1, since the cold storing medium is solid phase changing storage material, the housing may be omitted. The evaporating part of the heat tube device is a U-shaped tubular type heat tube device 10b, wherein the heat tube can be inserted directly after drilling in the solid energy storing medium, thus facilitating installation. In order to facilitate installation, the U-shaped tube may also be disposed in a circular protection bushing.

Figure 9:
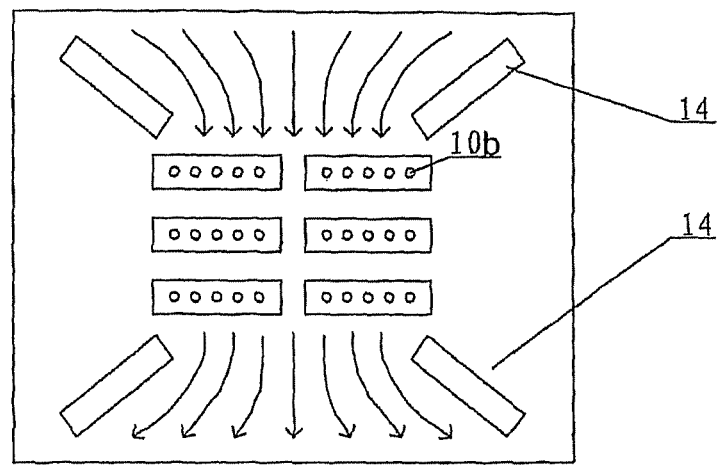
FIG. 9 is a view in the direction A shown in FIG. 8.

Referring to FIG. 9, an induced wind shield 14 may be disposed around the condensing part of the heat tube in order to increase the heat exchanging power of said condensing part and the air. In this way, the wind speed in the condensing part of the heat tube is partially increased, thereby improving the heat conduction efficiency of the heat tube.

The present embodiment adopts natural soil as the energy storing medium so as to simplify the civil engineering construction and reduce the cost.

Embodiment 3 of the Energy Storing Device

Figure 10:
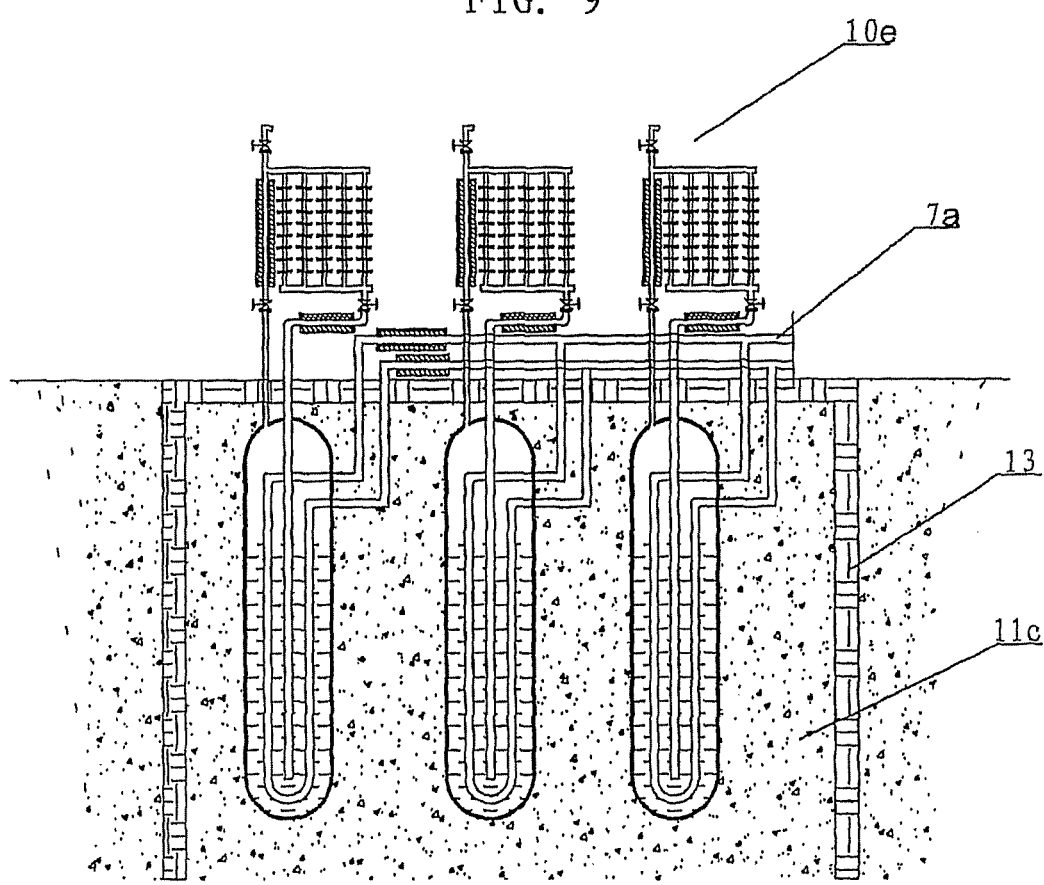
FIG. 10 is a third structural schematic view showing the energy storing device in the present invention.

Referring to FIG. 10, compared with the embodiment 2, the energy storing medium is natural soil, gravel or rock 11c. An insulating material 13 is disposed on the periphery and top surface of the energy storing medium. The heat tube device is 10e.

Compared with the embodiment 1, since the cold storing medium is soil or rock, it is not easy to dispose the insulating material at the bottom, and it is not easy to dispose the heat tube device 10a, but it is very suitable to dispose the heat tube device 10e. The heat tube can be inserted directly after drilling in the soil or rock, thus facilitating installation. It is more suitable for large-scale cold storing and centralized cold supplying project, or large-scale heat storing and centralized heat supplying project.

If the volume of the cold storing device is big enough, for example, with the side length greater than 100 m, and the dissipation area on the surface of the heat storing body is smaller with respect to its volume, the insulating layer 13 at the periphery may be replaced by other cheaper insulating materials.

In order to prevent loss of heat energy, the ascending tube, the reflow tube and the power cycle pipelines of the heat tube 10e are provided with an insulating layer other than the insulating material 13. For the sake of clarity of the tubing, they are partially omitted in the diagrammatic representation, and it is the same as below.

Embodiment 1 of the Air Conditioning Device and the Building System

Figure 11:
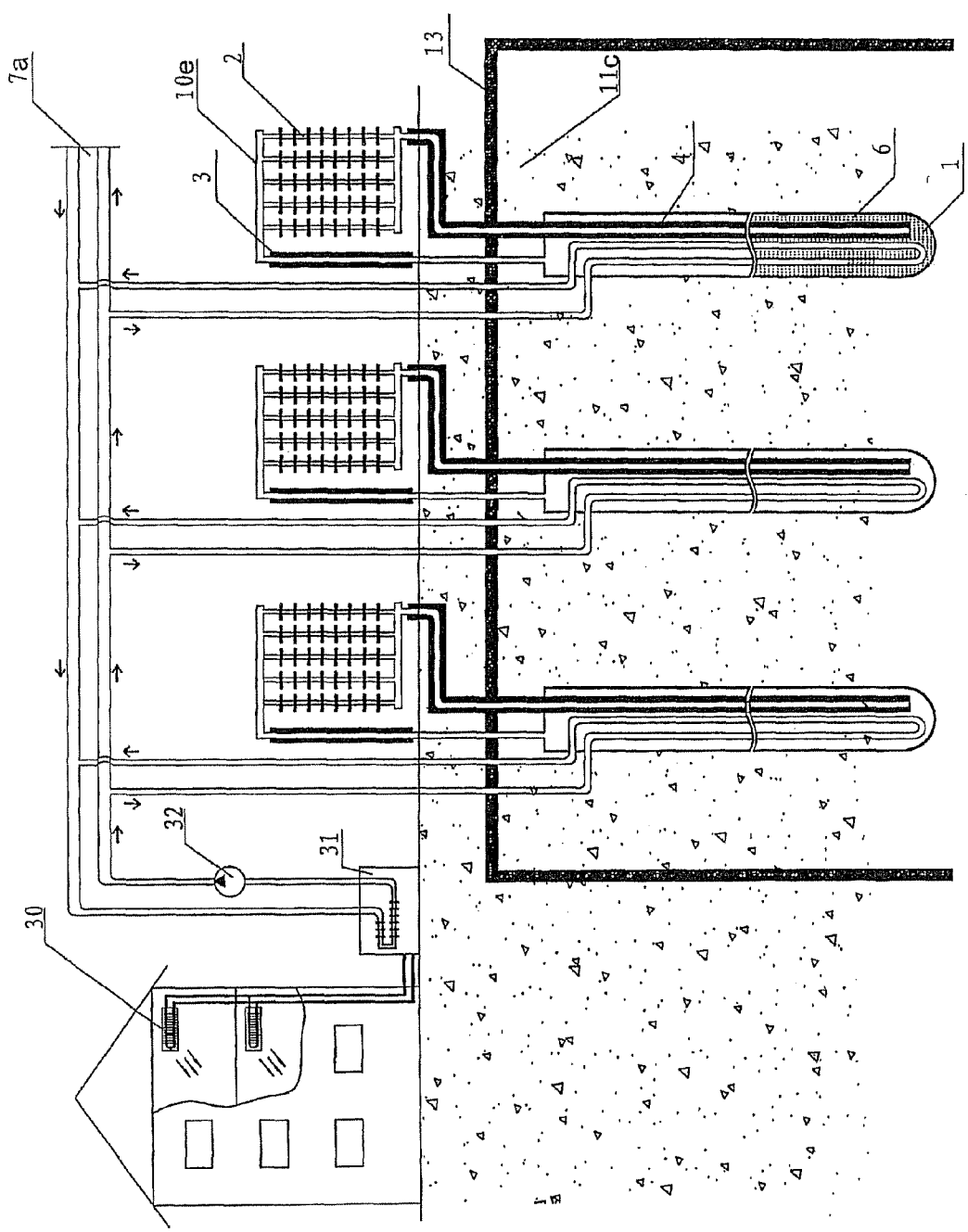
FIG. 11 is a first structural schematic view showing the air conditioning device and the building system in the present invention.

Referring to FIG. 11, an air conditioning device comprises an energy storing device and a terminal loop, the terminal loop comprising an air conditioning terminal, which is a fan coiler 30 positioned inside a building. The energy storing device is a cold storing device, and the energy storing medium is natural soil 11c, in which well holes are drilled deeply in a matrix distribution, especially the distribution in a honeycomb shape with the highest efficiency. The heat tube device of 10e is used in the well holes. An insulating material 13 is disposed on the periphery and the top of the energy storing medium. An insulating layer is also provided outside of an ascending tube 3 and a reflow tube 4. The evaporating part 1 of the heat tube device 10e is under the ground along with the energy storing medium, and the condensing part 2 of the heat tube device is in the ambient atmosphere above the ground. A layer of soil may be further laid on the insulating material 13 at the top of the cold storing medium for flowers and grass.

A heat exchanger 31 is disposed between the fan coiler 30 and the energy storing device. A residential community may be provided with one centrally, or each building may be provided with one respectively. Power cycle tubes pipelines 7a in the evaporating part of the heat tube, in parallel connection with each other, exchange heat with the heat exchanger. The power cycle pipelines 7a have a circulating pump 32 and are provided with an insulating material at the exposed portion (not shown).

The operating principle is as follows. In winter, when the ambient temperature is lower than the temperature of energy storing medium, the heat tube automatically transfers the heat energy from the energy storing medium into the ambient atmosphere, cooling the energy storing medium until the natural soil as the energy storing medium freezes, and storing a great amount of cold energy in the form of sensible heat or latent heat. In summer, the stored cold energy is extracted by power cycle, and is input into the air conditioning terminal after exchanging heat with the heat exchanger.

The advantage of said structure is that no excavation and backfill is required during the construction, which reduces the cost of the project. Cold storage is completed automatically without energy consumption of product, and there is no discharge of greenhouse gases and fluorine gases, no wearing of equipment, and no noise. Only releasing cold requires energy consumption of circulation pumping. The present system is suitable for the cold supplying for a single building or for centralized cold supplying for a residential community, and also suitable for the geothermal utilization of industry, agriculture and other industries, only by using corresponding cold supplying terminal.

Figure 12:
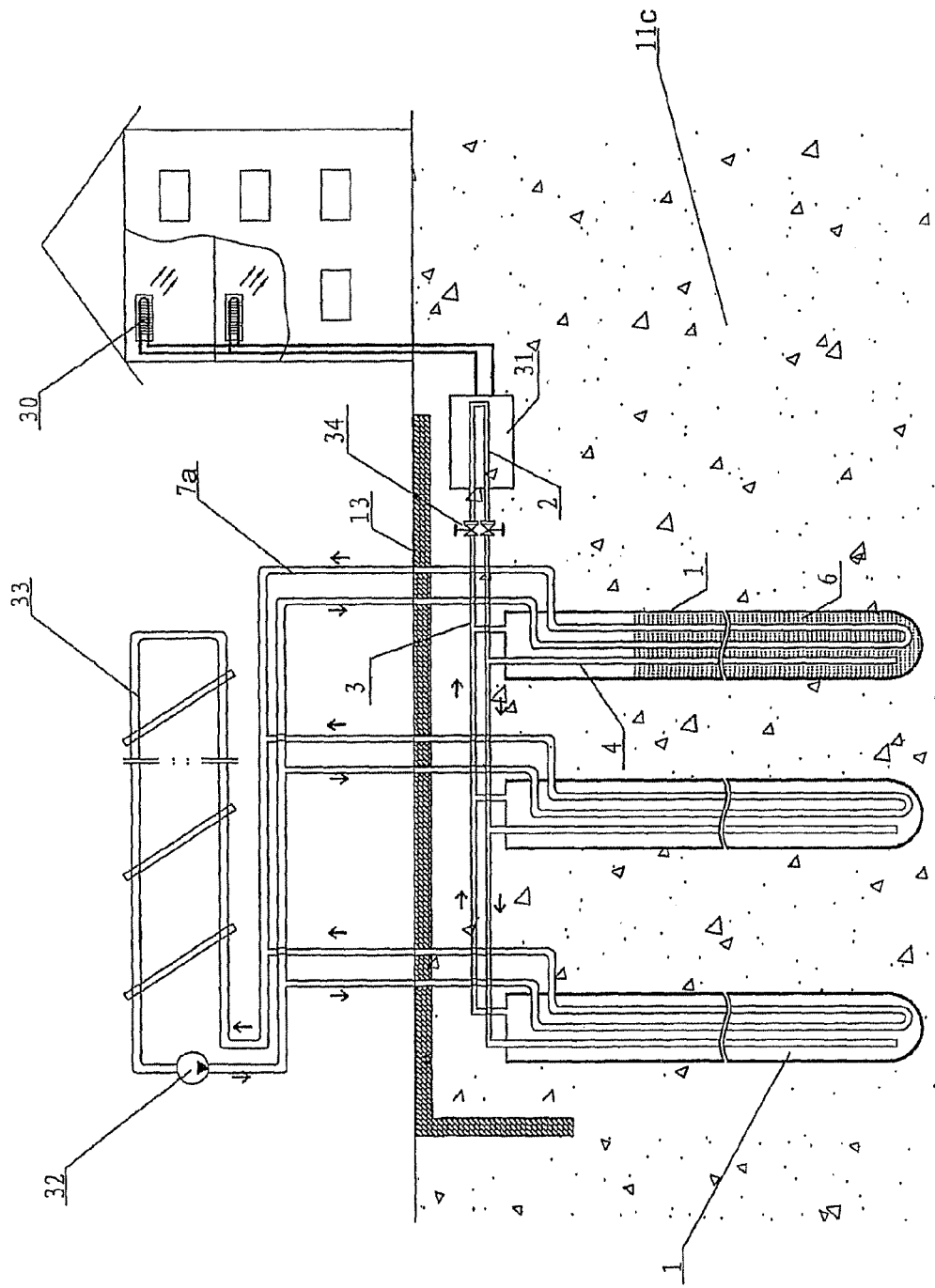
FIG. 12 is a second structural schematic view showing the air conditioning device, the geothermal energy utilizing device and the building system in the present invention.

Embodiment 2 of the Air Conditioning Device, Geothermal Energy Utilizing Device and the Building System Referring to FIG. 12, compared with the embodiment 1, the energy storing device is a heat storing device, and the energy storing medium is still natural soil 11c, in which well holes are drilled deeply in a matrix distribution, especially the distribution in a honeycomb shape with the highest efficiency. The heat tube device of 10e is used in the well holes. An insulating material 13 is disposed on the top of the energy storing medium and partially on the periphery. An insulating layer is also provided outside an ascending tube 3 and a reflow tube 4. The evaporating part of the heat tube device 10e is under the ground along with the energy storing medium, and the condensing part 2 is in the heat exchanger. The condensing part is not provided with fin tubes.

A heat exchanger 31 is disposed between the fan coiler 30 and the energy storing device. Power cycle pipelines 7a in the evaporating part of the heat tube are connected in parallel with each other, and then are communicated with a solar energy heat collection device 33. The power cycle pipelines 7a are provided with a circulating pump 32 and the insulating material is also disposed at the exposed portion outside of the power cycle pipelines. The heat exchanger 31 exchanges heat with the air conditioning terminal 30.

In summer and autumn, the heat generated by the solar energy heat collection device 33 is transferred into the energy storing medium 11c through the evaporating part of the heat tube via the circulating pump 32 and the power cycle pipelines 7a. The valve 34 is shut off when the heat energy is input into the energy storing medium in order to prevent the heat energy from dissipating through the condensing end. When supplying heat in winter, the valve 34 is opened such that the stored heat energy is input into the heat exchanger 31 and the air conditioning terminal 30 through the condensing part of the heat tube for dissipation. The heat exchanging process of the heat energy from the evaporating part of the heat tube to the heat exchanger 31 is automatically completed by the ascending thermal power due to evaporation of the working substance and by the gravity after being cooled, and no pumping circulation is required, which saves energy. Of course, when the thermal power is insufficient, it is also possible to connect the power cycle pipelines 7a to the heat exchanger 31 for forced heat exchanging.

Since the energy storing body is huge, there is less dissipation of heat energy and very high efficiency of heat storing. Besides the solar energy heat collecting device, of course, the heat supplying source may be a heat pump for industrial residual heat, domestic thermal waste or peak-valley electricity heating, or heat pump using wind energy for heating. In the heat supplying seasons, i.e. winter and spring, such energies as solar energy can be stored while being outputted.

Using the present device, the heat source or energy source temporally variable, e.g. solar energy and wind energy, and the heat source spatially distributed can be stored in an energy storing medium in the form of thermal energy, and can be extracted for use when necessary. The heat output is stable and may compensate for solar energy and wind energy which are likely affected by time variation. In addition, the heat efficiency is high regardless of using heat pump and storing heat in hot seasons, or using solar energy for heating in a summer.

Besides the above said heat sources of artificial storage, the present system may be used as a geothermal energy utilizing device in some regions having good geothermal condition. In principle, the external heat supplying source may be omitted, and no heat storage is required. Of course, the external heat source may also be used as a supplementary heat source. In this case, the evaporating part 1 of the heat tube device 10e is in the geothermal layer. When using the heat, the valve 34 is opened such that the natural geothermal is inputted into the heat exchanger 31 through the condensing part of the heat tube, and the heat is supplied via the air conditioning terminal 30. The heat exchanging process of the heat energy from the evaporating part of the heat tube to the heat exchanger 31 is automatically completed by the ascending thermal power due to evaporation of the working substance and by the gravity after being cooled, and no pumping circulation is required, which saves energy. Of course, when the thermal power is insufficient, it is also possible to connect the power cycle pipelines 7a to the heat exchanger 31 for forced heat exchanging.

If the temperature of the stored heat or geothermy is lower than the temperature of the direct heat supplying, a heat pump may be used to elevate the temperature of the primary heat source from the stored heat or geothermy, and then supply heat (the heat pump not shown). Compared with the water source heat pump, the process of extracting the geothermy does not depend on water cycle, and therefore there is no water pollution, energy consumption or discharge, which is good for environment protection.

The present system is suitable for the heat supplying for a single building or for centralized heat supplying for a residential community, and also suitable for the geothermal utilization of industry, agriculture and other industries, only by using corresponding heat supplying terminal.

Embodiment 3 of the Air Conditioning Device and the Building System

Figure 13:
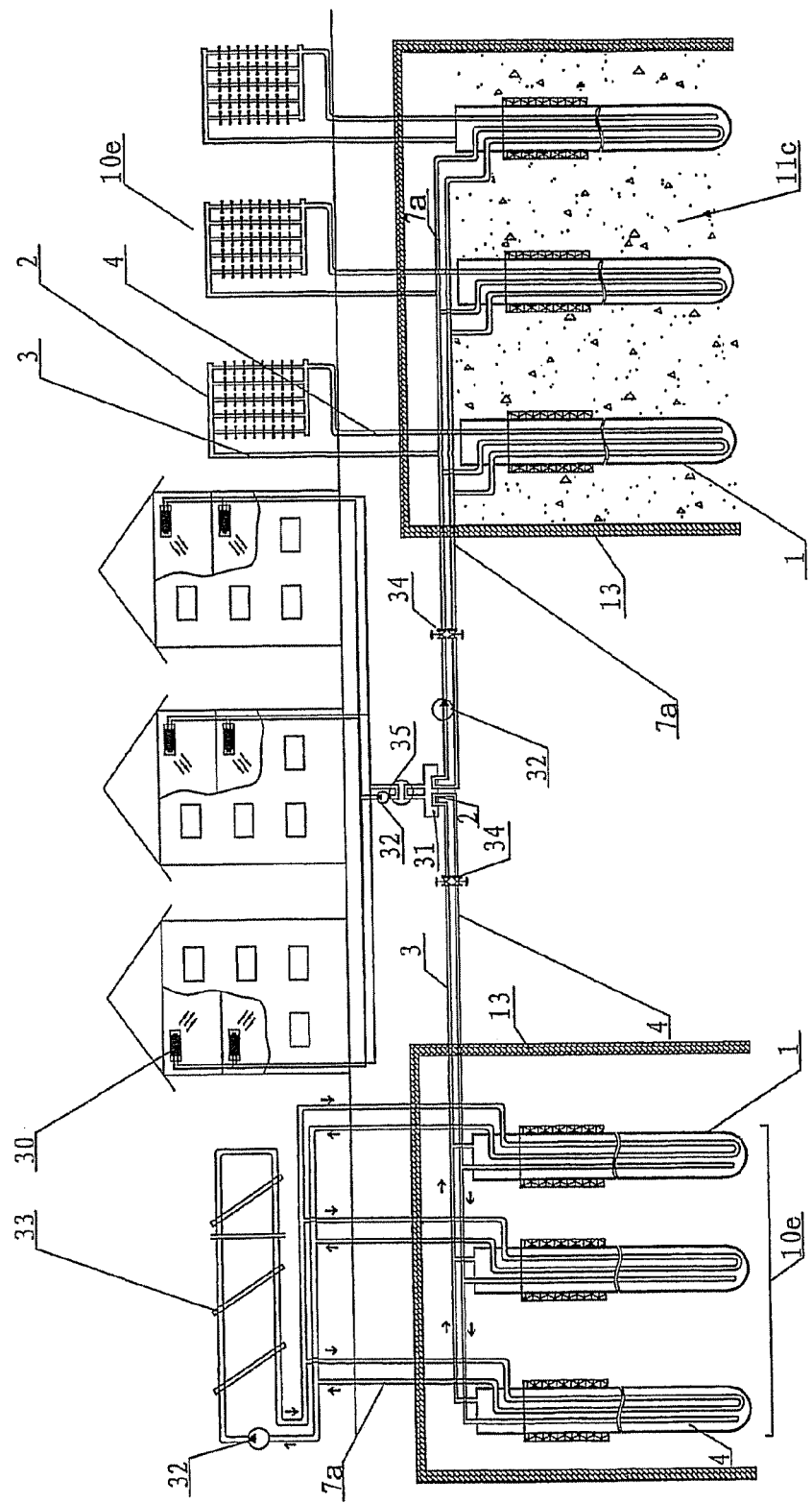
FIG. 13 is a third structural schematic view showing the air conditioning device and the building system in the present invention.

Referring to FIG. 13, compared with the embodiments 1 and 2, the present embodiment is a combination thereof, wherein the energy storing device comprises a cold storing device and a heat storing device. The energy storing device composed of the heat tube device 10e and cold storing medium such as soil or water forms a cold island, while the energy storing device composed of the heat tube device 10e and heat storing medium such as soil or water forms a heat island, the cold island and the heat island sharing a set of terminal loop to supply cold or heat for the building. Both the power cycle pipelines 7a at the cold source output end and the heat tube condensing end 2 at the cold source output end are connected to the terminal loop heat exchanger 31. Cold supplying and heat supplying are switched by the valve 34.

The cold storing process of the cold storing device in winter is automatically completed by the heat tube conducting cold downwardly, without any power, and the heat exchanging with the terminal loop heat exchanger is completed through the power cycle pipelines 7a. The heat storing process of the heat storing device is completed by the power cycle pipelines 7a, and the heat exchanging with the terminal loop heat exchanger is automatically completed by the ascending thermal power due to evaporation of the working substance, without any pumping power.

If the temperature of the stored cold, the stored heat or the geothermy is not suitable for direct heat exchange for supplying heat or cold, a heat pump 35 may be used to lower or elevate the temperature of the primary cold/heat source from the stored cold, stored heat or geothermy, and then to supply cold or heat.

The present system is suitable for the cold and heat supplying for a single building or for centralized cold and heat supplying for a residential community, and also suitable for the geothermal utilization of industry, agriculture and other industries, only by using corresponding heat supplying terminal.

If the energy storing body has sufficient volume, except for the electricity consumption of the pump circulation and the terminal fan, there is no energy consumption, no discharge, no noise, and substantially no maintenance, natural and environmental friendly.

What is claimed is:

1. A heat tube device, comprising:
  an evaporating part comprising one or more thimble tubes having a cavity portion therein, the one or more thimble tubes including an upper orifice in communication with an ascending tube, the one or more thimble tubes further including one or more reflow tubes at least partially disposed within the cavity portion;
  a condensing part having an upper end and a lower end, the condensing part further comprising one or more condensing tubes having one or more externally disposed fins, wherein the upper end of the condensing part is connected to the upper orifice of the evaporating part through the ascending tube, and wherein the lower end of the condensing part is in communication with a lower end of the evaporating part through the reflow tube; and
  wherein the cavity portion further comprises one or more power cycle tubes having an inlet and outlet, the inlet and outlet of the one or more power cycle tubes being positioned external to the evaporating part.

2. The heat tube device of claim 1, wherein the ascending tube further comprises an insulating layer disposed on an external surface thereof.

3. The heat tube device of claim 1, wherein at least one of the reflow tube and an upper part of the evaporating tube further comprises an insulating layer disposed on an external surface thereof.

4. The heat tube device of claim 1, further comprising one or more valves disposed within one or more of the (i) ascending tube; (ii) reflow tube; (iii) evaporation part; and (iv) condensing part.

5. A storage device, comprising:
  a heat tube device, comprising:
    an evaporating part comprising one or more thimble tubes having a cavity portion therein, the one or more thimble tubes including an upper orifice in communication with an ascending tube, the one or more thimble tubes further including one or more reflow tubes at least partially disposed within the cavity portion;
  a condensing part having an upper end and a lower end, the condensing part further comprising one or more condensing tubes having one or more externally disposed fins, wherein the upper end of the condensing part is connected to the upper orifice of the evaporating part through the ascending tube, and wherein the lower end of the condensing part is in communication with a lower end of the evaporating part through the reflow tube; and wherein the cavity portion further comprises one or more power cycle tubes having an inlet and outlet, the inlet and outlet of the one or more power cycle tubes being positioned external to the evaporating part.

6. The storage device of claim 5, wherein the energy storing medium is natural rocky soil or phase changing storage material.

7. The storage device of claim 5, wherein an insulating material is provided at the periphery and top surface of the energy storing medium.

8. The storage device of claim 5, wherein one or more power cycle tubes are disposed within an energy storage medium.

9. The storage device of claim 5, wherein the tube wall of the ascending tube, and/or the tube wall of the reflow tube, and/or the tube wall of the upper part of the evaporating tube of the heat tube device is made of a material with a low heat conduction coefficient, or has an insulating layer disposed outside the tube wall of the ascending tube, and/or the tube wall of the reflow tube, and/or the tube wall of the upper part of the evaporating tube of the heat tube device.

10. An air conditioning device, comprising:
a storage device, including:
a heat tube device, comprising:
an evaporating part comprising one or more thimble tubes having a cavity portion therein, the one or more thimble tubes including an upper orifice in communication with an ascending tube, the one or more thimble tubes further including one or more reflow tubes at least partially disposed within the cavity portion;
a condensing part having an upper end and a lower end, the condensing part further comprising one or more condensing tubes having one or more externally disposed fins, wherein the upper end of the condensing part is connected to the upper orifice of the evaporating part through the ascending tube, and wherein the lower end of the condensing part is in communication with a lower end of the evaporating part through the reflow tube;
wherein the cavity portion further comprises one or more power cycle tubes having an inlet and outlet, the inlet and outlet of the one or more power cycle tubes being positioned external to the evaporating part.

11. The air conditioning device of claim 10, wherein a heat exchanger is disposed between the terminal loop and the storage device, the storage device exchanging heat with the heat exchanger, and the heat exchanger exchanging heat with the terminal loop.

12. The air conditioning device of claim 10, wherein a heat pump is disposed between the terminal loop and the storage device or the heat exchanger, the primary cold source or primary heat source input end of the heat pump exchanging heat with the storage device or the heat exchanger, and the output end of the heat pump exchanging heat with the terminal loop.

13. The air conditioning device of claim 10, wherein the storage device is a cold storing device;
wherein the condensing part of the heat tube device is in an atmosphere; and
wherein the power cycle tubes at least one of (i) are directly connected to a terminal loop; and (ii) exchange heat with a terminal loop via a heat exchanger.

14. The air conditioning device of claim 13, wherein the power cycle tubes exchange heat via a heat exchanger and store cold energy in an energy storage medium.

15. The air conditioning device of claim 13, wherein cold energy is produced using one or more of peak-valley electricity refrigeration and wind energy refrigeration, the power cycle tubes storing the cold energy in an energy storage medium.

16. The air conditioning device of claim 10, wherein the storage device is a heat storing device, the condensing part of the heat tube device being directly connected to a terminal loop.

17. The air conditioning device of claim 16, wherein the power cycle tubes are connected to a heat supplying source;
wherein the heat supplying source comprises one or more of (i) industrial residual heat; (ii) a solar energy heat collection device; (iii) a heat pump using peak-valley electricity for heating; and (iv) a heat pump using wind energy for heating.

18. The storage device of claim 10, wherein the tube wall of the ascending tube, and/or the tube wall of the reflow tube, and/or the tube wall of the upper part of the evaporating tube of the heat tube device is made of a material with a low heat conduction coefficient, or has an insulating layer disposed outside the tube wall of the ascending tube, and/or the tube wall of the reflow tube, and/or the tube wall of the upper part of the evaporating tube of the heat tube device.

19. A building system comprising:
a building and an air conditioning device, said air conditioning device comprising:
a storage device, including:
a heat tube device, including:
an evaporating part comprising one or more thimble tubes having a cavity portion therein, the one or more thimble tubes including an upper orifice in communication with an ascending tube, the one or more thimble tubes further including one or more reflow tubes at least partially disposed within the cavity portion;
a condensing part having an upper end and a lower end, the condensing part further comprising one or more condensing tubes having one or more externally disposed fins, wherein the upper end of the condensing part is connected to the upper orifice of the evaporating part through the ascending tube, and wherein the lower end of the condensing part is in communication with a lower end of the evaporating part through the reflow tube;
wherein the cavity portion further comprises one or more power cycle tubes having an inlet and outlet, the inlet and outlet of the one or more power cycle tubes being positioned external to the evaporating part; and
wherein an air conditioning terminal of the air conditioning device is inside the building and an energy storage medium is located under the ground.

20. The building system of claim 19, wherein the storage device is a cold storing device, the evaporating part of the heat tube device is positioned under the ground, and the condensing part of the heat tube device is positioned in an atmosphere outside the building and above the ground, the power cycle tubes are disposed in the evaporating part of the heat tube device and are one or more of (i) connected directly to the air conditioning terminal; and (ii) exchange heat with the air conditioning terminal via a heat exchanger or heat pump.

21. The building system of claim 19, wherein the storage device is a heat storing device;
one or more power cycle tubes are disposed in the evaporating part of the heat tube device or in the energy storing medium;

the power cycle tubes being connected to a source of heat to be stored;

the condensing part of the heat tube device one or more of (i) being connected directly to the air conditioning terminal; and (ii) exchanging heat with the air conditioning terminal via a heat exchanger or heat pump.

22. The building system of claim 19, wherein the storage device comprises a cold storing device and a heat storing device, both connected to the terminal loop, wherein when supplying cold, the terminal loop exchanges heat with the cold storing device, and when supplying heat, the terminal loop exchanges heat with the heat storing device.

23. A geothermal utilizing device, comprising:
a heat tube device, including:
an evaporating part comprising one or more thimble tubes having a cavity portion therein, the one or more thimble tubes including an upper orifice in communication with an ascending tube, the one or more thimble tubes further including one or more reflow tubes at least partially disposed within the cavity portion;
a condensing part having an upper end and a lower end, the condensing part further comprising one or more condensing tubes having one or more externally disposed fins, wherein the upper end of the condensing part is connected to the upper orifice of the evaporating part through the ascending tube, and wherein the lower end of the condensing part is in communication with a lower end of the evaporating part through the reflow tube;
wherein the cavity portion further comprises one or more power cycle tubes having an inlet and outlet, the inlet and outlet of the one or more power cycle tubes being positioned external to the evaporating part; and wherein the evaporating part of the heat tube device is positioned in a geothermal layer and the condensing part is positioned in at least one of an object to be heated and a heat exchanger, the object to be heated comprising solid, liquid, gas, or a building.

24. The geothermal utilizing device of claim 23, wherein a terminal loop is connected to and exchanges heat with the heat exchanger, and then supplies heat to the object to be heated via the terminal loop, the terminal loop comprising an air conditioning terminal, which includes a fan coiler, a radiator, a ground coiler or a tubule grid.

25. The geothermal utilizing device of claim 23, wherein the tube wall of the ascending tube, and/or the tube wall of the reflow tube, and/or the tube wall of the upper part of the evaporating tube of the heat tube device is made of a material with a low heat conduction coefficient, or has an insulating layer disposed outside the tube wall of the ascending tube, and/or the tube wall of the reflow tube, and/or the tube wall of the upper part of the evaporating tube of the heat tube device.

* * * * *